(12) United States Patent
Kobayashi et al.

(10) Patent No.: US 7,321,213 B2
(45) Date of Patent: Jan. 22, 2008

(54) MOTOR CONTROLLER

(75) Inventors: Shigeru Kobayashi, Toyohashi (JP);
Seiichi Watanabe, Nishikamo-gun (JP);
Seiichi Tanaka, Toyota (JP)

(73) Assignee: ASMO Co., Ltd., Shizuoka (JP)

( * ) Notice: Subject to any disclaimer, the term of this patent is extended or adjusted under 35 U.S.C. 154(b) by 6 days.

(21) Appl. No.: 11/483,683

(22) Filed: Jul. 11, 2006

(65) Prior Publication Data

US 2007/0035896 A1 Feb. 15, 2007

(30) Foreign Application Priority Data

Jul. 20, 2005 (JP) ............... 2005-210455

(51) Int. Cl.
*H02P 1/04* (2006.01)

(52) U.S. Cl. .............. 318/471; 318/470; 388/800; 388/831; 361/25; 361/33; 713/320; 714/51; 714/55

(58) Field of Classification Search ........ 318/470–471; 388/800, 831; 361/25, 33; 713/320; 714/51, 714/55
See application file for complete search history.

(56) References Cited

U.S. PATENT DOCUMENTS

| | | | |
|---|---|---|---|
| 6,094,026 A * | 7/2000 | Cameron | 318/471 |
| 6,321,029 B1 * | 11/2001 | Kuo | 388/800 |
| 6,490,699 B2 * | 12/2002 | Nishibe et al. | 714/55 |
| 6,854,064 B2 * | 2/2005 | Ahn | 713/300 |
| 6,880,096 B2 * | 4/2005 | Sumida | 713/320 |
| 6,900,607 B2 * | 5/2005 | Kleinau et al. | 318/432 |
| 7,071,649 B2 * | 7/2006 | Shafer et al. | 318/783 |
| 7,199,549 B2 * | 4/2007 | Kleinau et al. | 318/798 |
| 2003/0071594 A1 * | 4/2003 | Kleinau et al. | 318/567 |
| 2003/0076061 A1 * | 4/2003 | Kleinau et al. | 318/432 |
| 2003/0076064 A1 * | 4/2003 | Kleinau et al. | 318/567 |
| 2003/0076065 A1 * | 4/2003 | Shafer et al. | 318/567 |
| 2006/0101605 A1 * | 5/2006 | Fujiwara | 15/319 |

FOREIGN PATENT DOCUMENTS

| | | |
|---|---|---|
| JP | Y2-6-49074 | 1/1987 |
| JP | A-11-164472 | 6/1999 |

* cited by examiner

*Primary Examiner*—Paul Ip
(74) *Attorney, Agent, or Firm*—Posz Law Group, PLC

(57) ABSTRACT

A motor controller is provided with: an estimated temperature calculating means that calculates an estimated temperature of a motor; and a control unit that can perform a driving control of the motor only when the estimated temperature is not larger than a predetermined value. A mode switching means switches the control unit and the estimated temperature calculating means between in a normal operation mode in which they can drive the motor and in a sleep mode in which electric power consumption thereof is smaller than in the normal operation mode in accordance with a predetermined condition while the motor is stationary. An activating means activates the estimated temperature calculating means in the sleep mode for a predetermined active time every time a predetermined sleep time is elapsed.

7 Claims, 10 Drawing Sheets

MOTOR CONTROLLER

CROSS REFERENCE TO RELATED APPLICATION

This application is based upon and claims the benefit of priority of Japanese Patent Application No. 2005-210455 filed on Jul. 20, 2005, the content of which is incorporated herein by reference.

FIELD OF THE INVENTION

The present invention relates to a motor controller and, in particular, to a motor controller that has the function of calculating the estimated temperature of a motor so as to protect the motor from being burned.

BACKGROUND OF THE INVENTION

Conventionally, a protection element such as a bimetal and a PTC is built in a motor housing for protecting the motor from being burned. When a motor abnormally generates heat, an electric circuit is intercepted by this protection element and the passage of electric current through the motor is stopped.

However, when the above-mentioned protection element is arranged near the motor, the size of the motor is enlarged to increase the size of an entire device. Therefore, in a motor controller described in JP-H11-164472-A, the above-mentioned protection element is not provided but a control unit for driving and controlling the motor calculates the estimated temperature of the motor on the basis of the magnitude of voltage applied to the motor, a voltage applying time, and the last estimated temperature. In the motor controller described in JP-H11-164472-A, when a calculated estimated temperature becomes not less than a predetermined overheating temperature, driving of the motor is stopped and a stopping state is further maintained until the estimated temperature reaches an overheating protection release temperature.

By the way, since a lot of electrical components are mounted in a vehicle, there is presented a problem that load applied to a vehicle-mounted battery for supplying electric power to these electrical components increases. Therefore, it is necessary to reduce the power requirements of the electrical components.

However, in the motor controller that calculates the estimated temperature of the motor, even in a state where the motor is stopped and then an ignition switch is turned off to thereby stop generating power by driving an engine, an adequate estimated temperature is required when the motor is again driven and hence the motor controller needs to continuously perform the processing of calculating the estimated temperature. For this reason, a microcomputer needs to continuously perform the processing of calculating the estimated temperature although the motor is stationary. Therefore, there is posed a problem that the microcomputer continues consuming the electric power of the vehicle-mounted battery.

SUMMARY OF THE INVENTION

In view of the above-mentioned problems, it is the object of the present invention to provide a motor controller capable of performing the processing of calculating the estimated temperature of a motor while the motor is stationary and of reducing operating electric power when the ignition switch of a vehicle is turned off.

The motor controller is provided with: an estimated temperature calculating means that calculates an estimated temperature of a motor; and a control unit that can perform a driving control of the motor only when the estimated temperature is not larger than a predetermined value.

The motor controller is further provided with a mode switching means and an activating means. The mode switching means switches the control unit and the estimated temperature calculating means between in a normal operation mode in which the control unit and the estimated temperature calculating means can drive the motor and in a sleep mode in which electric power consumption of the control unit and the estimated temperature calculating means is smaller than in the normal operation mode in accordance with a predetermined condition while the motor is stationary. The activating means activates the estimated temperature calculating means in the sleep mode for a predetermined active time every time a predetermined sleep time is elapsed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Hereinafter, one embodiment of the present invention will be described with reference to the drawings. Of course, the construction and the procedure to be described below do not limit the present invention but can be variously modified according to the spirit of the invention.

Figure 1:
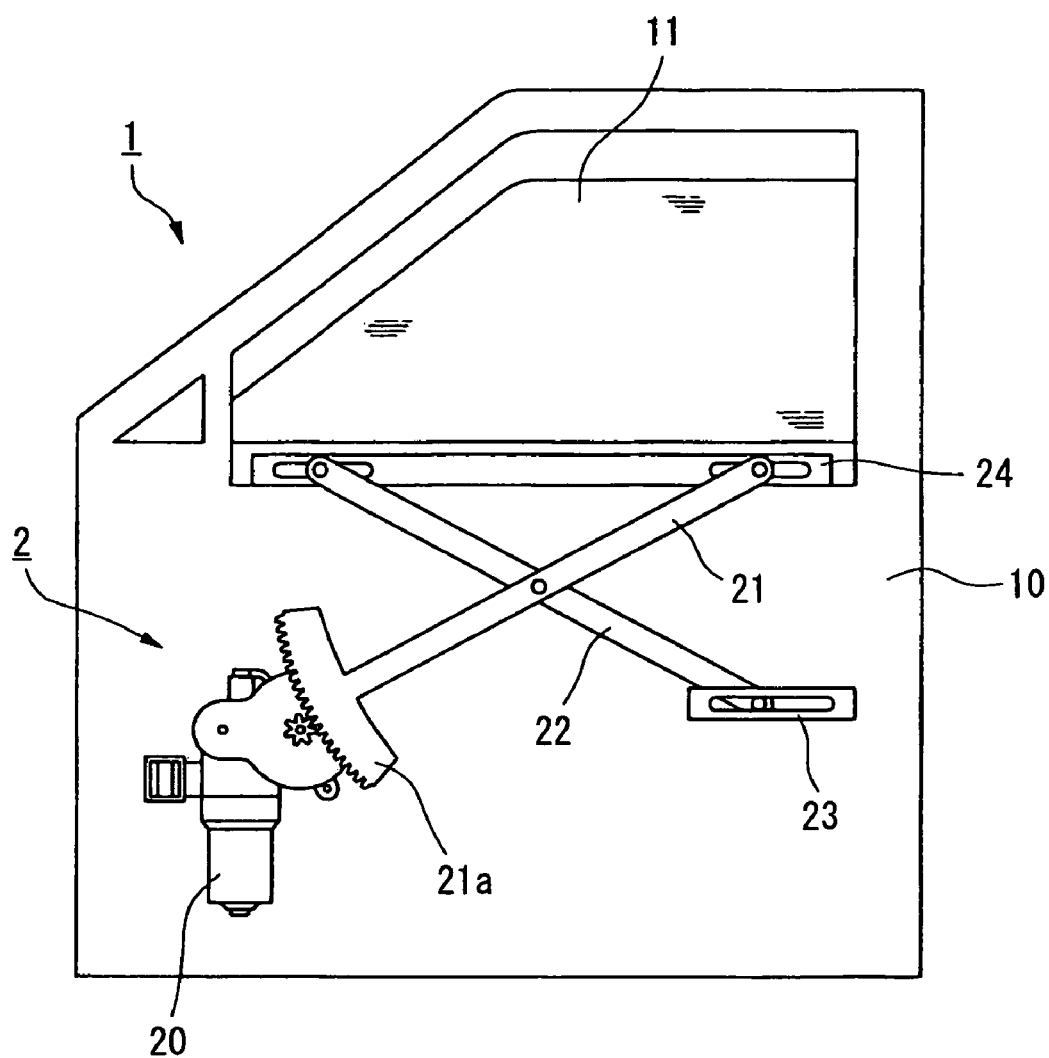
FIG. 1 is an explanatory diagram of a power window device according to one embodiment of the present invention.
Figure 2:
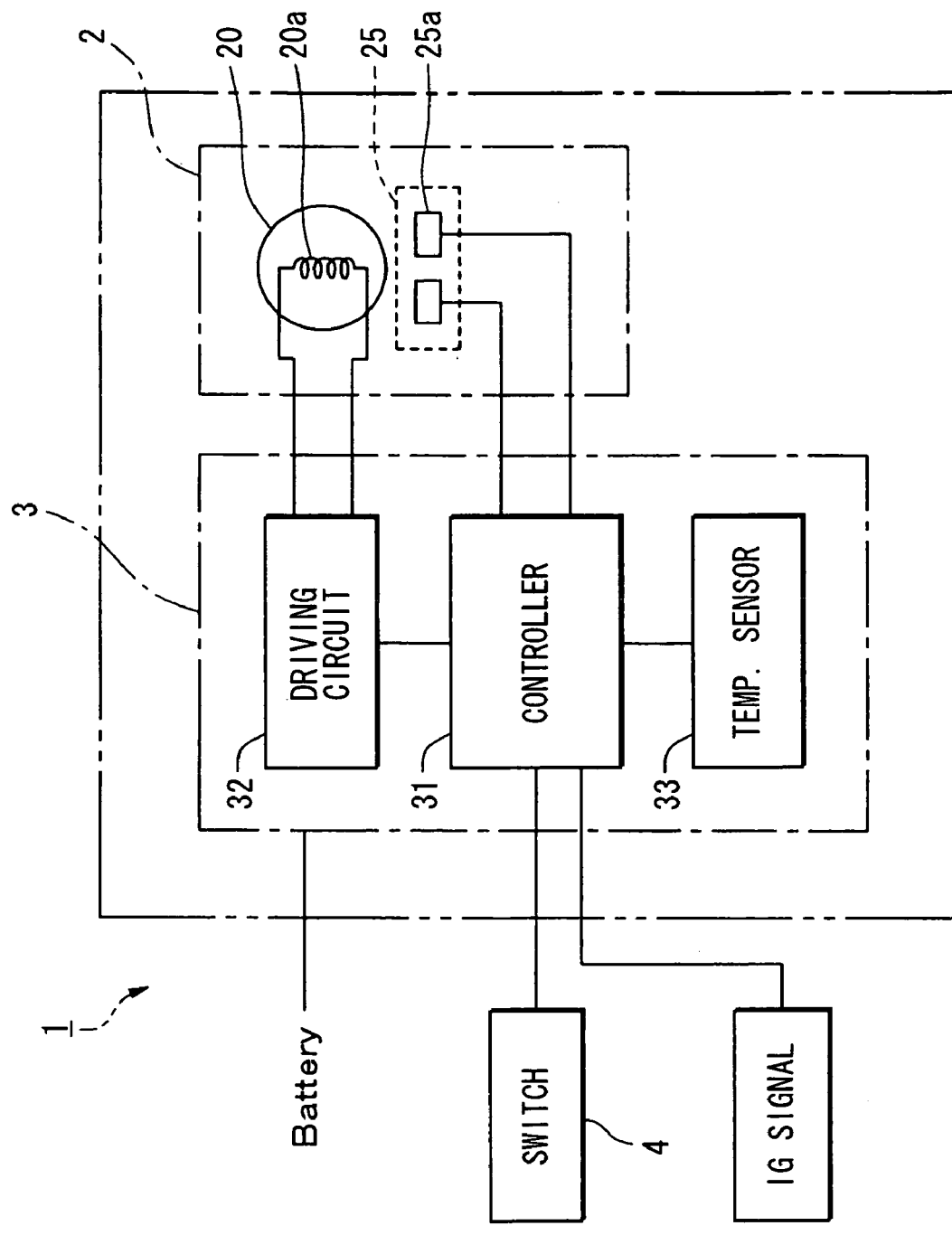
FIG. 2 is an electric configuration diagram of the power window device in FIG. 1.
Figure 3:
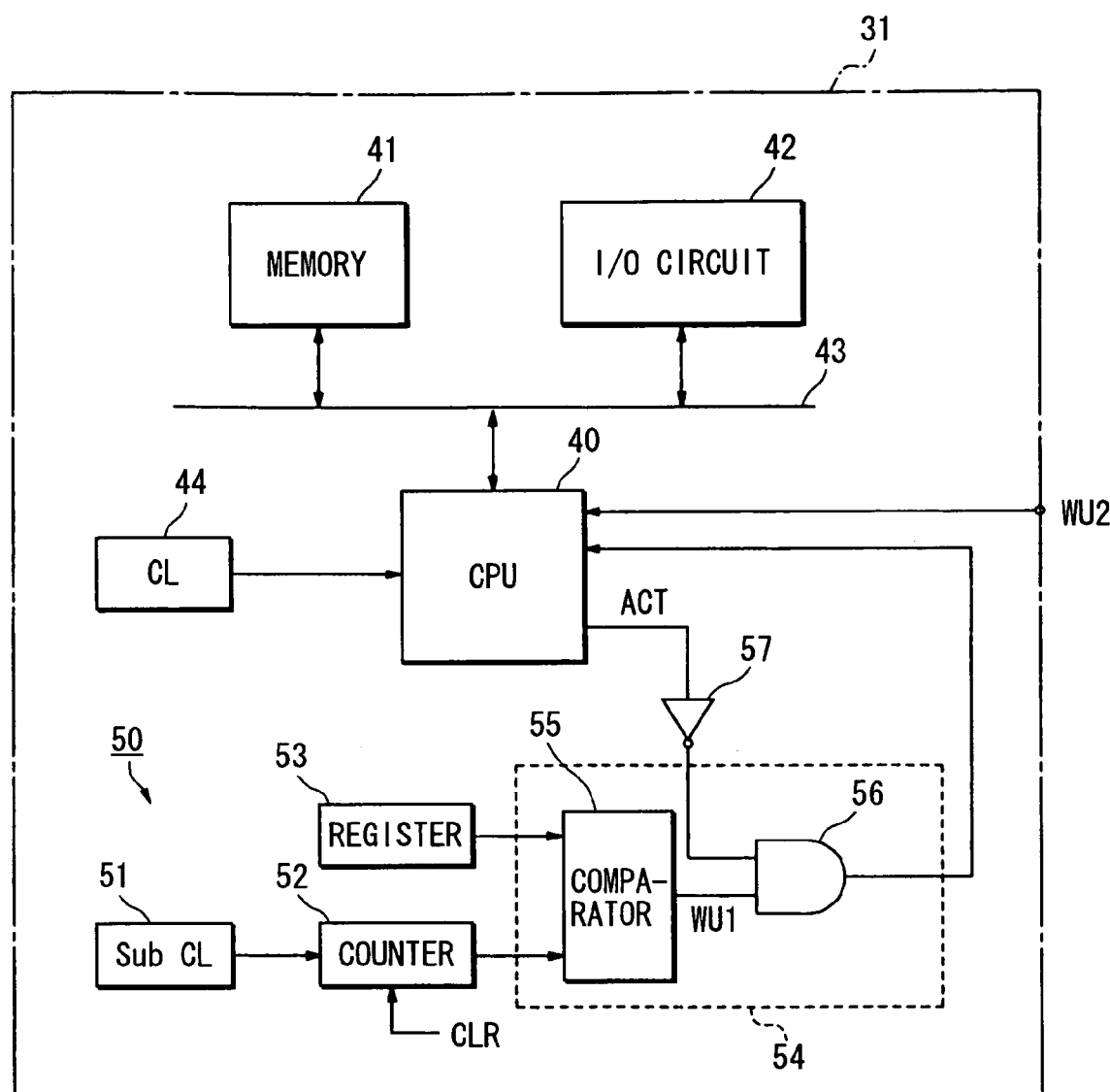
FIG. 3 is an electric configuration diagram of a controller in FIG. 2.
Figure 4:
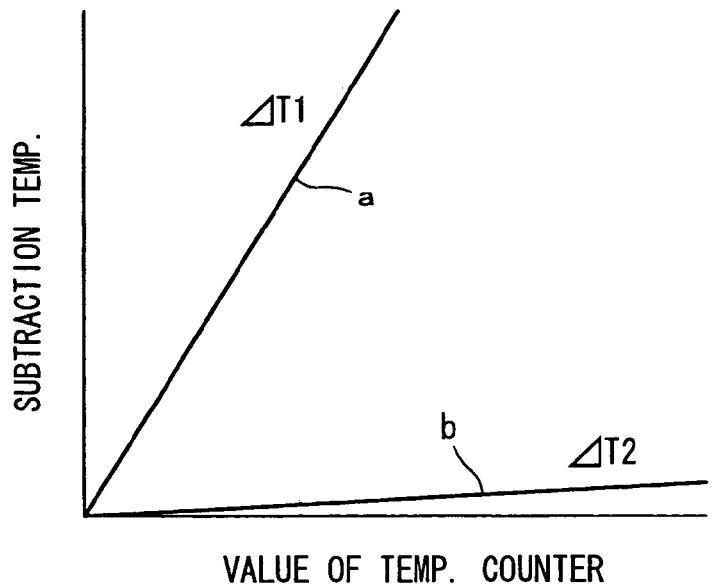
FIG. 4 is a graph to show subtraction temperature data while a motor is stationary.
Figure 5A:
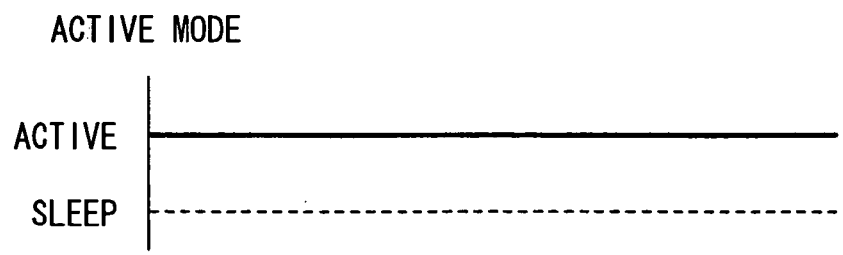
FIGS. 5A and 5B are explanatory diagrams that show the operation mode of the controller.
Figure 5B:
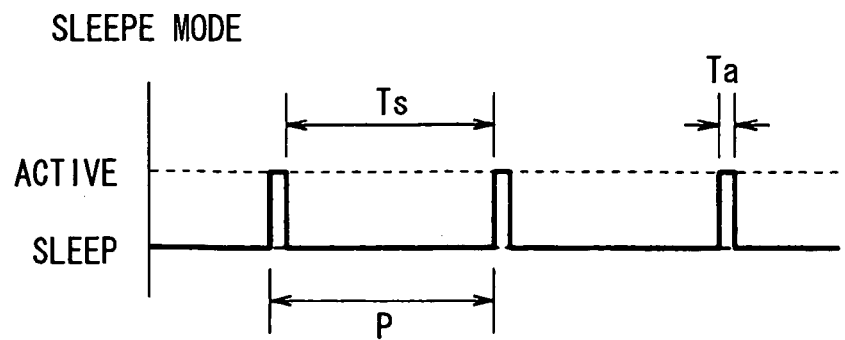
Figure 6:
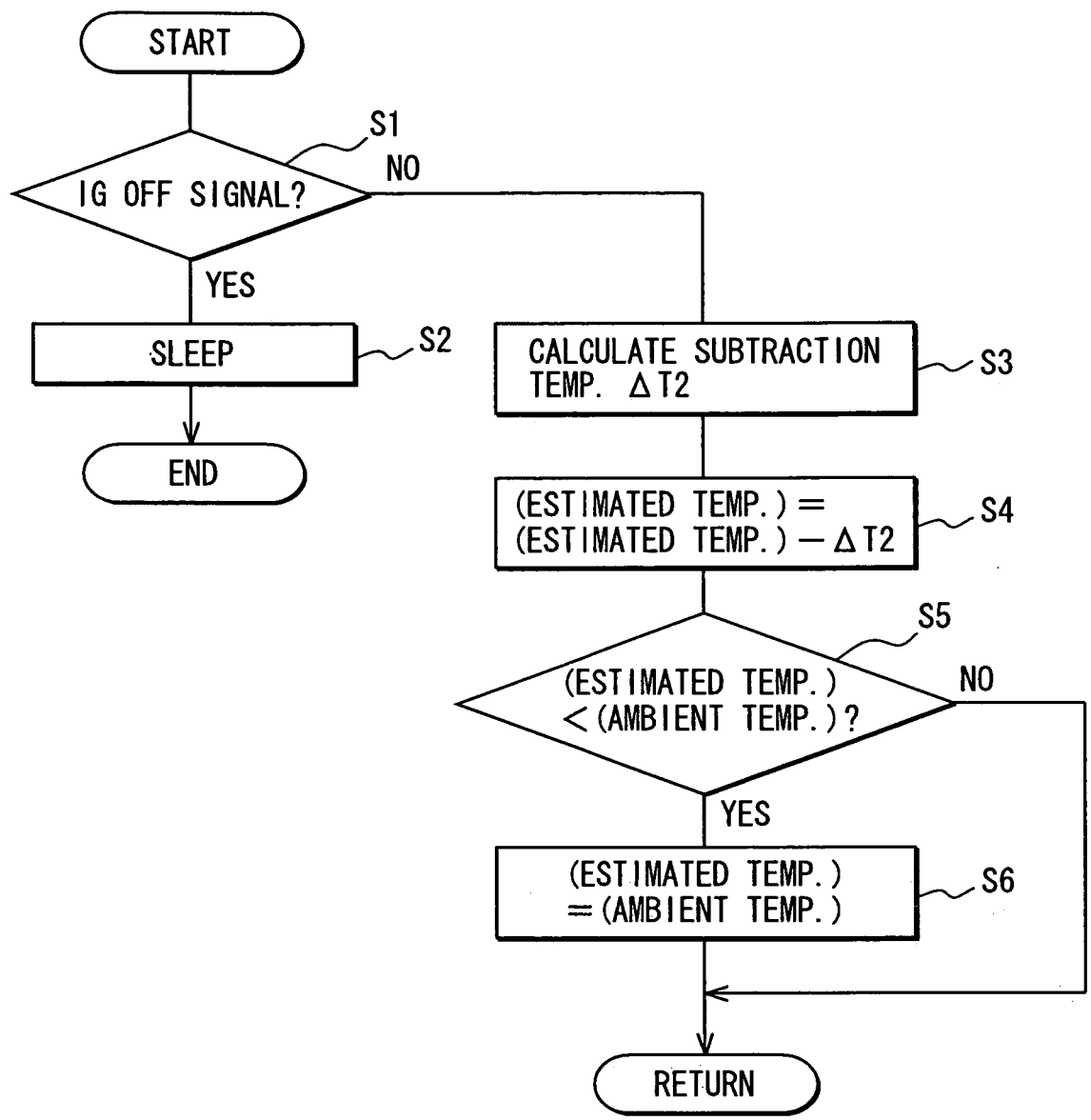
FIG. 6 is a processing flow to show the processing of calculating an estimated temperature in an active mode.
Figure 7:
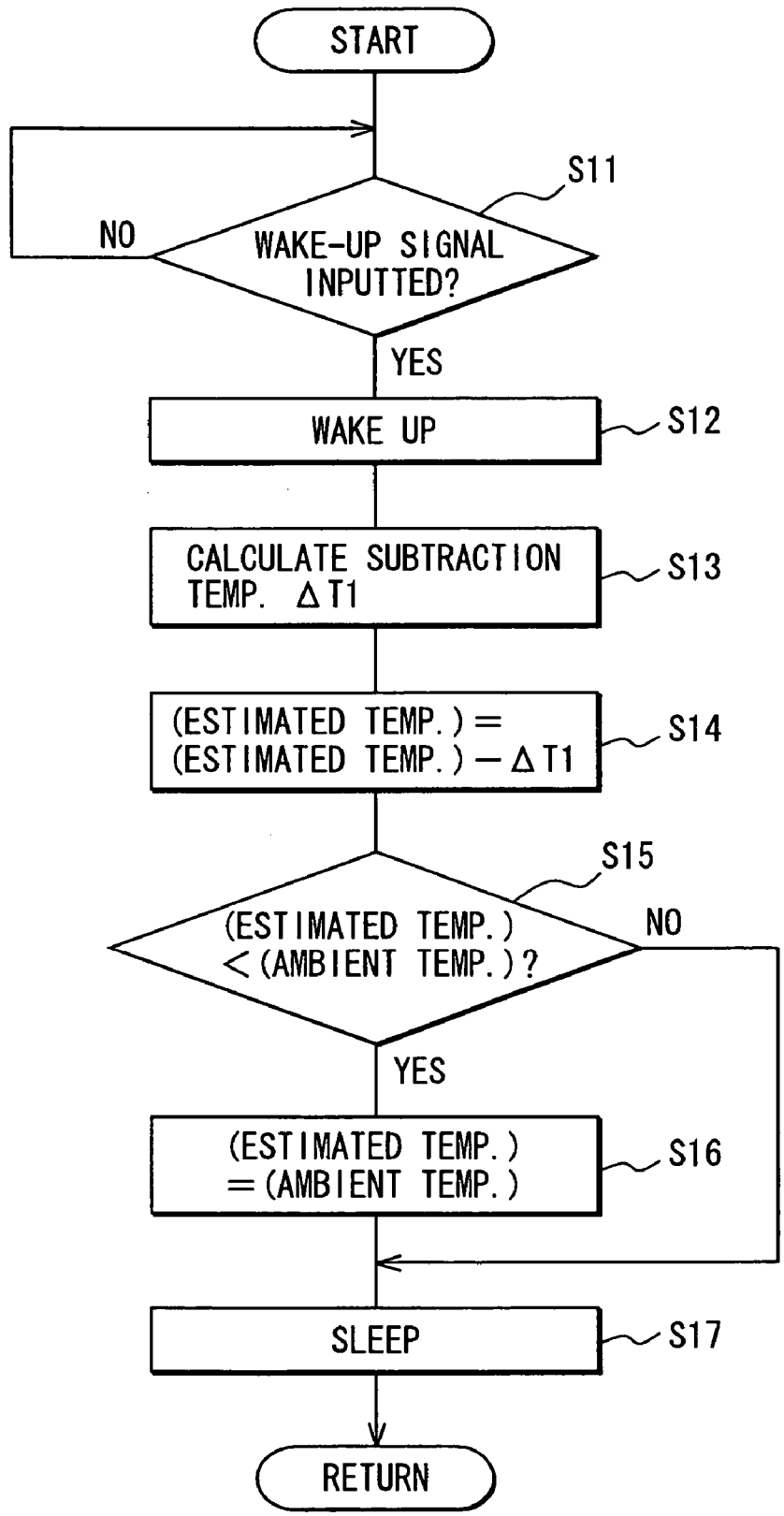
FIG. 7 is a processing flow to show the processing of calculating an estimated temperature in a sleep mode.

FIGS. 1 to 7 are the drawings relating to one embodiment of the present invention. FIG. 1 is an explanatory diagram of a power window device. FIG. 2 is an electric configuration diagram of the power window device in FIG. 1. FIG. 3 is an electric configuration diagram of a controller in FIG. 2. FIG. 4 is a graph to show subtraction temperature data when a motor is stationary. FIGS. 5A and 5B are explanatory diagrams that show the operation mode of the controller. FIG. 6 is a processing flow to show the processing of calculating an estimated temperature in an active mode. FIG. 7 is a processing flow to show the processing of calculating an estimated temperature in a sleep mode.

Figure 8:
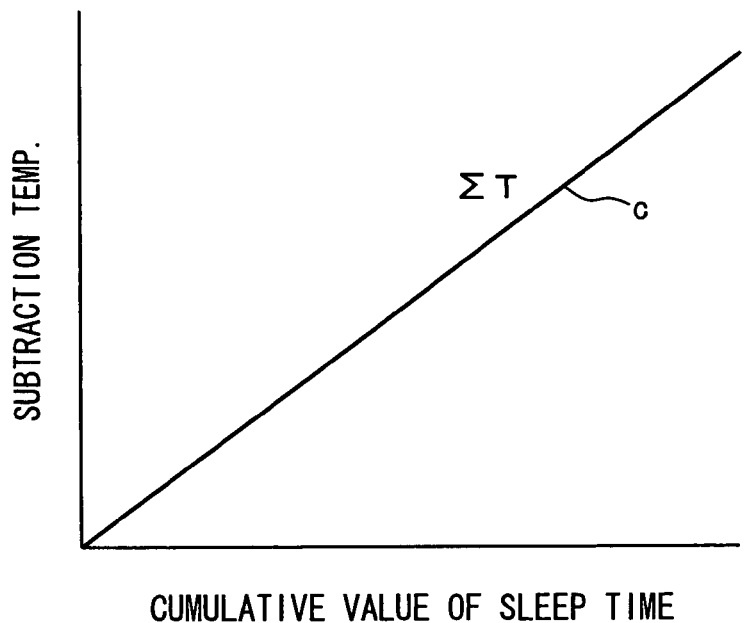
FIG. 8 is a graph to show subtraction temperature data when the motor is stationary according to another embodiment of the present invention.
Figure 9:
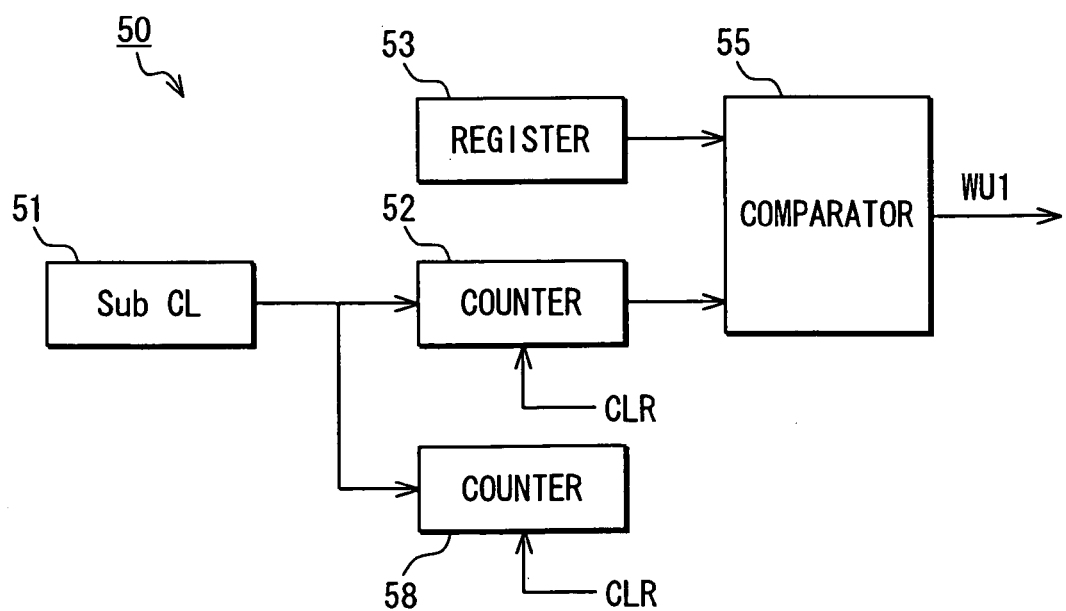
FIG. 9 is an explanatory diagram to show a part of the electric configuration of a sleep control circuit.
Figure 10:
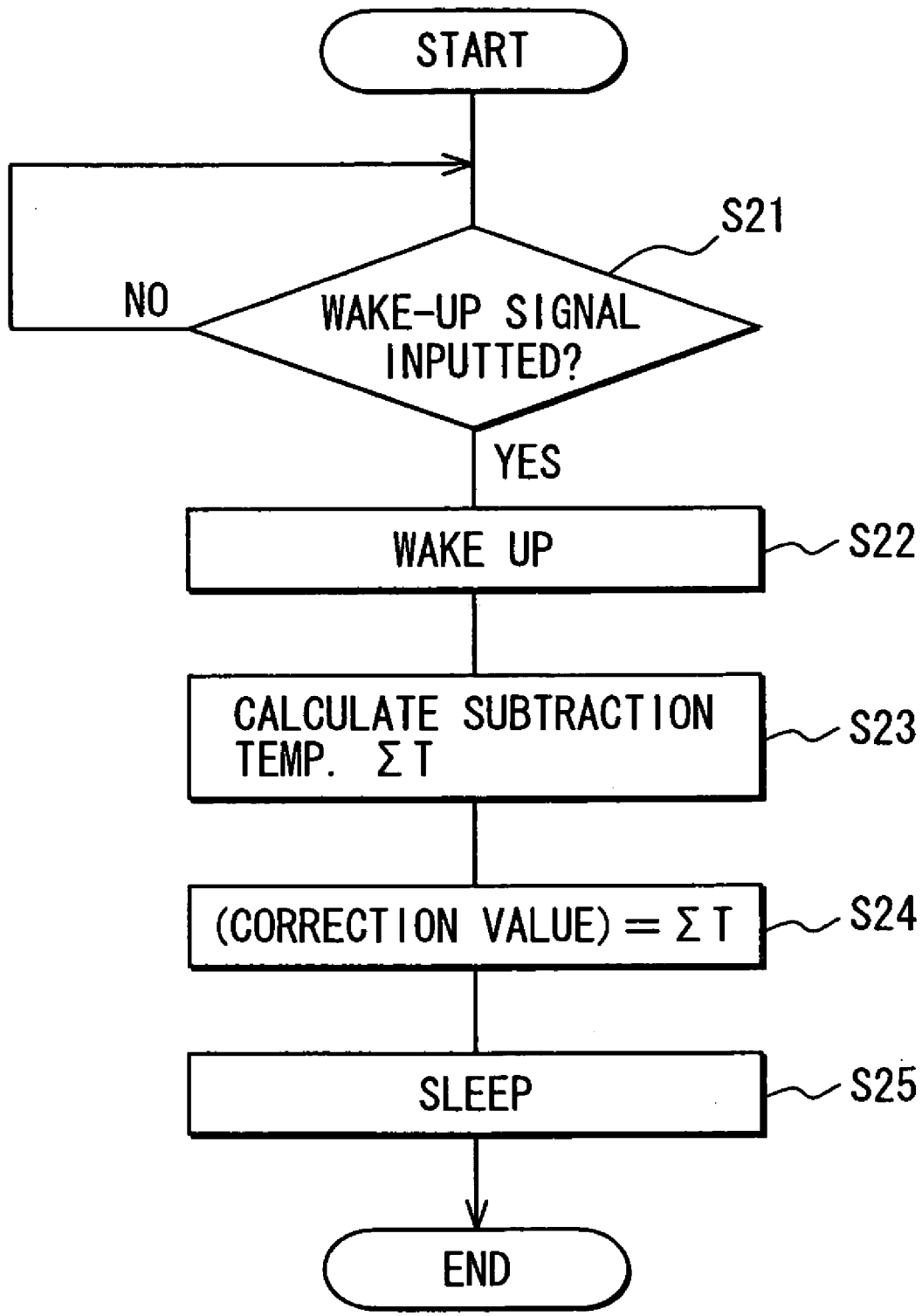
FIG. 10 is a processing flow to show the processing of calculating a correction value of an estimated temperature in a sleep mode.
Figure 11:
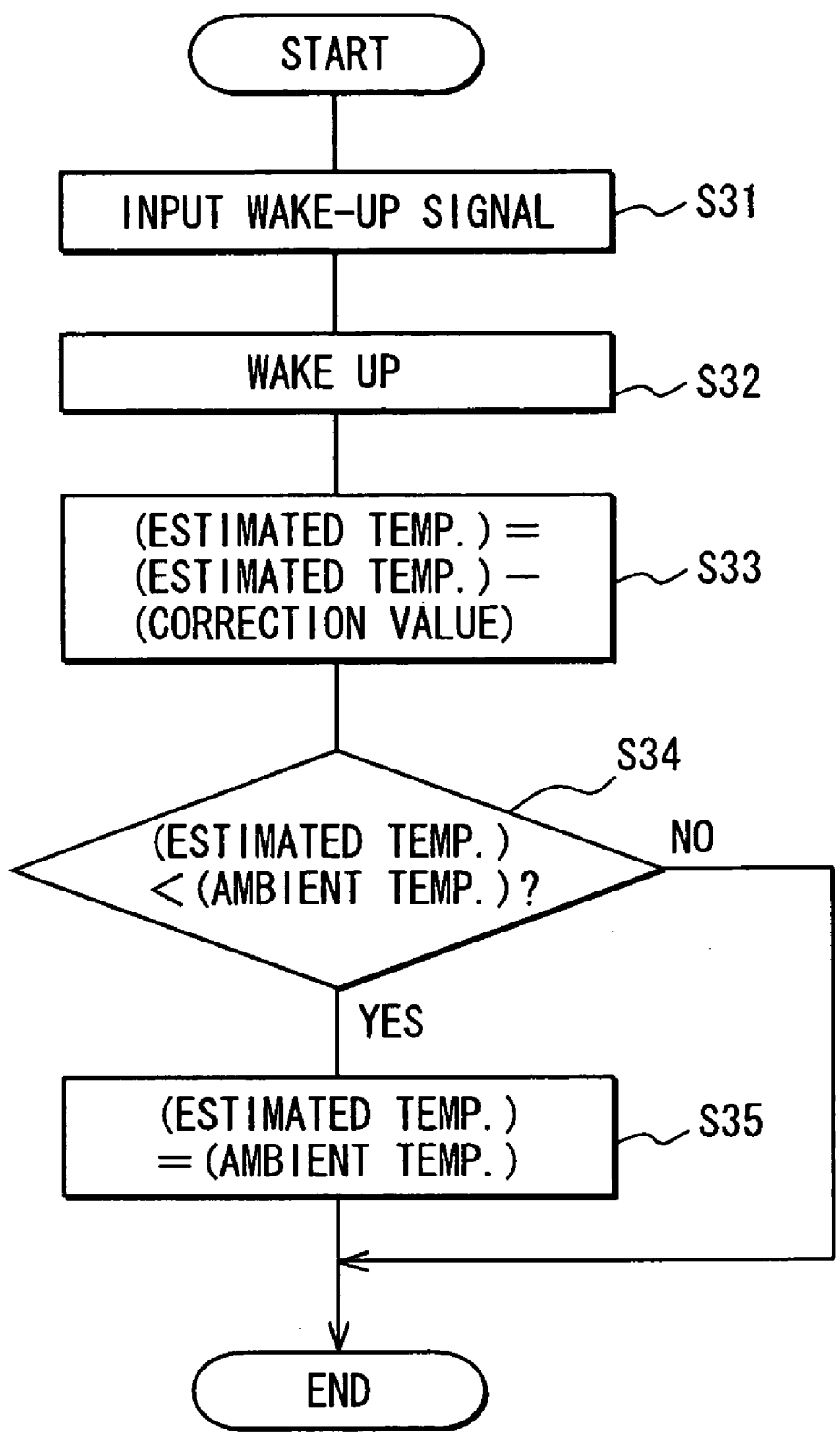
FIG. 11 is a processing flow to show processing at the time of returning to an active mode.

FIGS. 8 to 11 are the drawings relating to another embodiment of the present invention. FIG. 8 is a graph to show subtraction temperature data when the motor is stationary. FIG. 9 is an explanatory diagram to show a part of the electric configuration of a sleep control circuit. FIG. 10 is a processing flow to show the processing of calculating a correction value of an estimated temperature in a sleep mode. FIG. 11 is a processing flow to show processing at the time of returning to an active mode.

Figure 12:
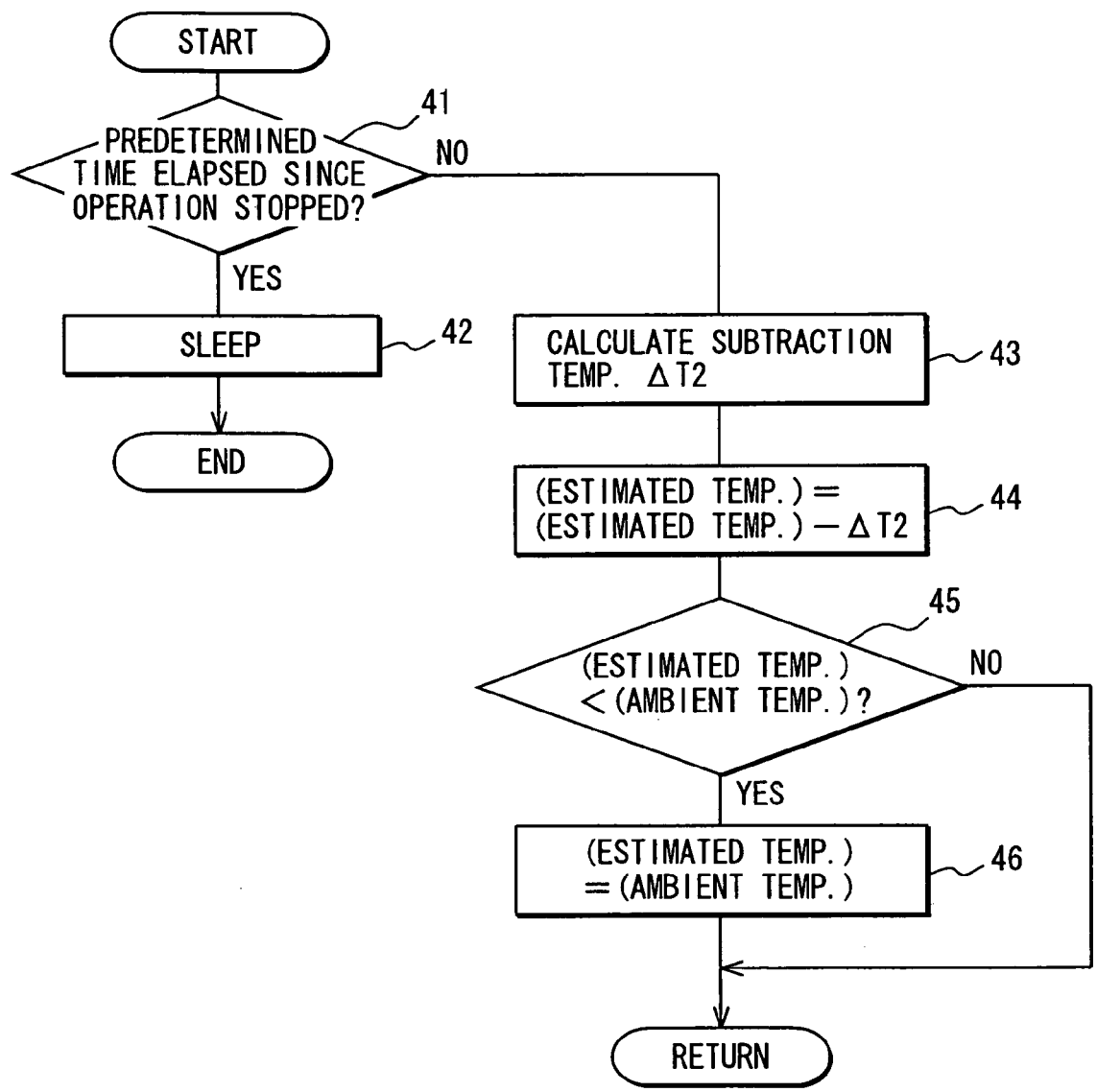
FIG. 12 is a processing flow to show the processing of calculating an estimated temperature in an active mode according to still another embodiment of the present invention.

FIG. 12 is a drawing relating to still another embodiment of the present invention and is a processing flow to show the processing of calculating an estimated temperature in an active mode.

Hereinafter, one embodiment will be described in which the motor controller of the present invention is applied to a power window device. An explanatory diagram of a power window device 1 of this embodiment (hereinafter, referred to as "device 1") is shown in FIG. 1 and its electric configuration diagram is shown in FIG. 2. The power window device 1 of this embodiment moves up and down (closes and opens) a window glass 11 as a moving member arranged in a door 10 of a vehicle by rotating and driving a motor 20. The power window device 1 has main constituent elements of: a moving up/down mechanism 2 for opening and closing the window glass 11; a control portion 3 for controlling the operation of the moving up/down mechanism 2; and an operating switch 4 by which an occupant provides an operation instruction.

In this embodiment, the window glass 11 moves up and down between an upper fully-closed position and a lower fully-opened position along a rail (not shown).

The moving up/down mechanism 2 of this embodiment has main constituent elements of: the motor 20 that has a speed reduction mechanism fixed to the door 10; a moving up/down arm 21 that has a gear 21a shaped like a fan and driven by the motor 20; a driven arm 22 that is mounted on the cross to and is rotatably supported by the moving up/down arm 21: a fixed channel 23 fixed to the door 10; and a glass-side channels 24 integrated with the window glass 11.

The motor 20 is constructed so that when the motor 20 of this embodiment is supplied with electric power from the control portion 3, the motor 20 has electric current passed through the winding 20a of its armature to thereby produce a magnetic attracting action between the armature and a stator having a magnet, thereby rotating the armature normally and reversely. In the moving up/down mechanism 2 of this embodiment, when the moving up/down arm 21 and the driven arm 22 swing according to the rotation of the motor 20, the moving up/down arm 21 and the driven arm 22 have their respective end parts restricted so as to slide by the channels 23, 24 and are driven as an X link to thereby move up and down the window glass 11.

A rotation detecting device (position detecting device) 25 is integrated with the motor 20 of this embodiment. The rotation detecting device 25 outputs a pulse signal synchronous with the rotation of the motor 20 to the control portion 3. The rotation detecting device 25 of this embodiment is constructed so as to detect a magnetic change in the magnet turning with the output shaft of the motor 20 by a plurality of Hall elements 25a.

The control portion 3 calculates a position to which or from which the window glass 11 is moved up or down by this pulse signal. Moreover, the control portion 3 can calculate the rotational speed of the motor 20 or the moving up/down speed of the window glass 11 corresponding to the rotational speed of the motor 20 by the interval of the pulse signals.

In this embodiment, a device using the Hall elements is adopted as the rotation detecting device 25. However, any encoder capable of detecting the rotational speed of the motor 20 may be adopted as the rotation detecting device 25. Moreover, in this embodiment, to detect the rotational speed of the output shaft of the motor 20 according to the movement of the window glass 11, the rotation detecting device 25 is integrated with the motor 20. However, the moving speed of the window glass 11 may be detected by well-known means.

The control portion 3 of this embodiment is constructed so that a controller 31, a drive circuit 32, and a temperature sensor 33 are arranged on a substrate. These parts are supplied with electric power necessary for operation by a battery mounted in the vehicle.

The controller 31 of this embodiment usually rotates the motor 20 normally and reversely through the drive circuit 32 on the basis of an operation signal from the operating switch 4 to thereby open and close the window glass 11. Moreover, the controller 31 is constructed so that a signal of electric power condition of the vehicle, which shows the state of driving the engine of the vehicle or the state of generating power of an alternator, is inputted to itself. For instance, the controller 31 is constructed so as to be able to have an ignition (IG) signal inputted thereto.

The controller 31 of this embodiment, as shown in FIG. 3, is constructed of a microcomputer including: a CPU40; a memory 41 such as a ROM and a RAM; an input/output circuit 42; a sleep control circuit 50; and the like. The CPU40, the memory 41, the input/output circuit 42, and the sleep control circuit 50 are connected to each other through a bus 43. Moreover, the processing programs performed by the CPU40 and various data are stored in the memory 41.

The drive circuit 32 of this embodiment is constructed of an IC including a FET and changes the polarity of electric power supplied to the motor 20 on the basis of a control signal from the controller 31. That is, when the drive circuit 32 receives a normal rotation command signal from the controller 31, the drive circuit 32 supplies electric power to the motor 20 to thereby rotate the motor 20 in a normal rotational direction. Moreover, when the drive circuit 32 receives a reverse rotation command signal from the controller 31, the drive circuit 32 supplies electric power to the motor 20 to thereby rotate the motor 20 in a reverse rotational direction. The drive circuit 32 may be constructed so as to change the polarity by the use of a relay circuit. Moreover, the drive circuit 32 may be constructed so as to be incorporated into the controller 31.

The temperature sensor 33 of this embodiment detects temperature around the substrate where the controller 31 and the like are arranged and is arranged at a position away from the motor 20 in this embodiment.

The controller 31 receives an ambient temperature detection signal from the temperature sensor 33 and calculates atmospheric temperature (ambient temperature) around the substrate on the basis of this signal. The temperature sensor 33 and the controller 31 correspond to an ambient temperature sensing section of the present invention.

Moreover, the controller 31 counts the magnitude of voltage applied to the motor 20 via the drive circuit 32 and the length of time that electric current is being passed. Moreover, the controller 31 monitors the rotational speed of motor 20 by a pulse signal from the rotation detecting device 25.

Moreover, the controller 31 stores the estimated temperature of the winding 20a (motor estimated temperature) in a temperature counter as estimated temperature storing means set in the memory 41. Moreover, the controller 31 stores reference data to calculate this estimated temperature in the memory 41. The controller 31 as estimated temperature calculating means calculates the variation (correction value) of the estimated temperature during the operation of the motor from the ambient temperature, the applied voltage, the length of time that electric current is being passed, the rotational speed, and the reference data of them, and the present estimated temperature, and adds this variation to the present estimated temperature to thereby calculate a new estimated temperature. This processing of calculating the estimated temperature is repeatedly performed at intervals of a predetermined repetition processing time.

In this embodiment, the estimated temperature of the winding 20a is especially calculated. However, the estimated temperature of the entire motor 20 may be calculated.

When this estimated temperature exceeds a predetermined temperature, the controller 31 stops electric power supply from drive circuit 32 to thereby prevent the winding 20a from being burned. Thus, in the device 1 of this embodiment, the electric power supply is stopped on the basis of the estimated temperature of the winding 20a calculated by the controller 31 to thereby protect the winding 20a from being burned. For this reason, in this embodiment, a comparatively large protection element such as a bimetal or a PTC does not need to be arranged in the main body of the motor 20 so as to detect the temperature of the winding 20a and hence the motor 20 can be reduced in size.

Moreover, to perform the processing of calculating the estimated temperature while the motor is stationary, the controller 31 as the estimated temperature calculating means stores subtraction temperature data, which sets a relationship between a subtraction temperature $\Delta T$ ($\Delta T1$, $\Delta T2$) per a predetermined time and the value of a present temperature counter (estimated temperature), in the memory 41.

That is, in this embodiment, while the motor is stationary, the value of the temperature counter is subtracted at intervals of a predetermined repetition time along with the passage of time on the basis of the subtraction temperature $\Delta T$. As a result, while the motor is stationary, the value of the temperature counter is subtracted finally to an ambient temperature calculated by the ambient temperature detection signal from the temperature sensor 33.

FIG. 4 shows subtraction temperature data. In the drawing, subtraction temperature data (a) corresponds to subtraction temperature $\Delta T1$ and subtraction thermal data (b) corresponds to subtraction temperature $\Delta T2$. In this embodiment, as will be described later, the controller 31 operates either in an active mode (normal operation mode) or in a sleep mode (operation mode of low electric power consumption) in which electric power consumption is less than in the active mode.

In the active mode, the temperature counter is updated at intervals of a predetermined repetition processing time (for instance, at intervals of 4 msec). The subtraction temperature data (b) is set as a temperature drop during this repetition processing time for the each value of the temperature counter.

By contrast, in the sleep mode, the temperature counter is updated at intervals of a sleep period P (refer to FIG. 5) obtained by adding an active time Ta (for instance, 4 msec) during which the controller 31 operates in the active (operating) state to a sleep time Ts (for example, 10 sec) during which the controller 31 operates in the sleep state. In this embodiment, even when the controller 31 operates in the sleep mode, the processing of calculating the estimated temperature of the motor is performed at intervals of a predetermined time and hence the adequate temperature of the motor can always be acquired.

The subtraction temperature data (a) is set as a temperature drop during this sleep period P for each value of the temperature counter. Therefore, the inclination of the subtraction temperature data (a) is lager than the inclination of the subtraction temperature data (b) in proportion to the length of the update time.

In this manner, in the processing of calculating the estimated temperature in the sleep mode, a correction value (subtraction temperature) is calculated and the value of the temperature counter is updated (subtracted) by using this correction value. Therefore, the temperature counter can be updated by the calculation processing of low load.

In the example shown in FIG. 4, each of the subtraction temperature data (a) and (b) is approximated by a linear function. However, each of the subtraction temperature data (a) and (b) may be approximated by a higher-order function for a plurality of temperature ranges.

Moreover, this embodiment is constructed so that the subtraction temperature $\Delta T$ may be uniquely determined by the value of the temperature counter. However, the subtraction temperature may be determined according to the magnitude of a temperature difference obtained by subtracting an ambient temperature from the value of the temperature counter. Even in this case, the value of the temperature counter can be finally made equal to the ambient temperature.

Moreover, in this embodiment, each of the temperature data (a) and (b) is set as a temperature drop to the repetition processing time. However, each of the subtraction thermal data (a) and (b) may be set as a temperature drop per unit time. In this case, the subtraction temperature data (a) is equal to the subtraction temperature data (b), and it is possible to adopt the processing of subtracting a temperature drop, which is expressed by the product of a lapse of time from the last processing time and the subtraction temperature data, at intervals of a repetition processing time.

The operating switch 4 of this embodiment is constructed of a toggle type switch or the like that can operate in two steps and is provided with an opening switch, a closing switch, and an automatic switch. When an occupant operates this operating switch 4, a command signal to open and close the window glass 11 is outputted to the controller 31.

Specifically, when the operating switch 4 is operated one step to one end side, the opening switch is turned on and a normal opening command signal to normally open the window glass 11 (that is, to open the window glass 11 only while the opening switch is being operated) is outputted to the controller 31. Moreover, when the operating switch 4 is operated one step to the other end side, the closing switch is turned on and a normal closing command signal to normally close the window glass 11 (that is, to close the window glass 11 only while the opening switch is being operated) is outputted to the controller 31.

While the controller 31 receives the normal opening command signal from the operating switch 4 (while the operating switch 4 is operated), the controller 31 drives the motor 20 through drive circuit 32 to normally open the window glass 11. By contrast, while the controller 31 receives the normal closing command signal from the operating switch 4 (while the operating switch 4 is operated), the controller 31 drives the motor 20 through drive circuit 32 to normally close the window glass 11.

Moreover, when the operating switch 4 is operated two steps to one end side, both of the opening switch and the automatic switch are turned on to thereby output an automatic opening command signal to automatically open the window glass 11 (that is, to open the window glass 11 to a fully-opened position even when operating the operating switch 4 is stopped) to the controller 31. Moreover, when the operating switch 4 is operated two steps to the other end side, both of the closing switch and the automatic switch are turned on to thereby output an automatic closing command signal to automatically close the window glass 11 (that is, to close the window glass 11 to a fully-closed position even when operating the operating switch 4 is stopped) to the controller 31.

Moreover, when the controller 31 receives the automatic opening command signal from the operating switch 4, the controller 31 drives the motor 20 via the drive circuit 32 to automatically open the window glass 11 to the fully-opened position. By contrast, when the controller 31 receives the automatic closing command signal from the operating switch 4, the controller 31 drives the motor 20 via the drive circuit 32 to automatically close the window glass 11 to the fully-closed position.

Next, the operation mode of the controller 31 of this embodiment will be described on the basis of FIG. 5.

The controller 31 of this embodiment, as described above, is constructed so as to operate in the active mode (normal operation mode) or in the sleep mode (operation mode of low electric power consumption). In the active mode, the controller 31 performs program processing such as the processing of driving and controlling the motor 20 on the basis of the operation signal from the operating switch 4 and the processing of calculating the estimated temperature of the motor 20. By contrast, the sleep mode is a power saving mode and in the sleep mode, only a minimum necessary amount of electric power required to keep the present state and to return to the active mode is consumed and hence the system is almost in a stopping state.

FIG. 5A schematically shows an active mode and the controller 31 is always in the active mode. The CPU 40 is constructed so as to perform a processing program stored in the memory 41 on the basis of a clock signal from a main clock 44. Here, in the active state, as will be later described, the CPU 40 outputs an active signal ACT (high-level signal).

By contrast, FIG. 5B schematically shows the sleep mode of this embodiment. The CPU 40 as mode switching means is constructed so as to shift to the sleep mode when the CPU 40 finishes the processing of operating the motor 20 on the basis of the operation signal from the outside or the like and then a predetermined time (for example, 3 minutes) passes. In this sleep mode, a sleep time Ts and an active time Ta are periodically repeated.

This sleep time Ts is set sufficiently longer than the active time Ta. With this, in the sleep mode, the controller 31 is in a stopping state for most of the time and hence can save electric power.

In this regard, in this embodiment, when a signal to show the state of ignition (IG) is inputted to the controller 31, the operation mode can be switched. Alternatively, when a signal to show the state of ignition (IG) is inputted to the controller 31 and then, for example, several tens seconds pass, the operation mode can be switched. Specifically, the controller 31 is constructed so as to be able to shift to the sleep mode when the controller 31 receives the OFF signal of ignition. However, the controller 31 may be constructed so as to shift from the active mode to the sleep mode when a predetermined condition is satisfied while the motor 20 is stationary. For example, the controller 31 may be constructed so as to shift to the sleep mode when a predetermined time is elapsed since the operation of the motor 20 is finished. Alternatively, the controller 31 may also be constructed so as to shift to the sleep mode when an estimated temperature reaches a predetermined temperature while the motor 20 is stationary.

In this manner, in the sleep mode of this embodiment, the active state and the sleep state are alternately repeated. In the sleep state, the CPU 40 stops performing the program sequentially.

However, the CPU 40 is constructed so that when the CPU 40 receives a wake-up signal WU1 from a sleep control circuit 50, the CPU 40 returns (wakes up) to the active state only for the active time Ta and then again automatically shifts to the state of sleep after performing predetermined processing.

Moreover, the CPU 40 is constructed so that when the CPU 40 receives an external signal (WU2), the CPU 40 returns (wakes up) from the sleep mode to the active mode.

As shown in FIG. 3, the sleep control circuit 50 of this embodiment generates a wake-up signal WU1 that instructs the CPU 40 to shift to the active mode when a predetermined return time (sleep time Ts) passes during the sleep mode, that is, from the time when the CPU 40 shifts to the sleep state. The sleep control circuit 50 includes a sub-clock 51, a counter 52, a register 53, and a signal producing circuit 54. The counter 52 and the register 53 are connected to a bus 43.

The counter 52 counts up a clock signal from the sub-clock 51 continuously operating while electric power is supplied to the controller 31. When the CPU 40 operates in the active mode, a clear signal CLR is regularly inputted to this counter 52. When this clear signal CLR is inputted to the counter 52, the count value of the counter 52 is reset.

The count set value of the clock signal according to the sleep time Ts is set in the register 53.

The signal producing circuit 54 includes: a comparator 55 to compare the count value of the counter 52 with the count set value of the register 53; and an AND gate 56 to pass the output signal of the comparator 55 only in the sleep mode. The comparator 55 outputs the wake-up signal WU1 when the count value of the counter 52 exceeds the count set value of the register 53. Moreover, the output signal of the comparator 55 is inputted to one input terminal of the AND gate 56 and an inverted signal obtained by inverting an active signal ACT from the CPU 40 is inputted to the other input terminal of the AND gate 56.

The CPU 40 continuously outputs the active signal ACT in the active state. The active signal ACT is a high-level signal and, in the active state, the output of an inverter 57 becomes a low-level signal. Hence, in the active state, the AND gate 56 is disabled and hence the wake-up signal WU1 of the high-level signal does not pass through the AND gate 56.

By contrast, in the state of sleep, the CPU 40 does not output the active signal ACT, so that an input to the inverter 57 becomes a low-level signal and hence the output of the inverter 57 becomes a high-level signal. With this, the AND gate 56 is enabled. When the wake-up signal WU1 is outputted in this state from the comparator 55, the AND gate 56 substantially passes the wake-up signal WU1.

The wake-up signal WU1 of an interrupt signal is inputted to the interrupt terminal of the CPU 40. With this, the CPU 40 immediately returns (wakes up) from the sleep state to the active state. After the CPU 40 returns to the active state, the CPU 40 performs the processing of calculating the estimated temperature, which will be later described, before the active time Ta passes and then the CPU 40 again shifts to the state of sleep. The sleep control circuit 50 and the CPU 40 correspond to activating means of the present invention.

Moreover, a wake-up signal WU2 of an interrupt signal from the outside is inputted to the CPU 40. In this embodiment, when the operating switch 4 is operated, the wake-up signal WU2 is inputted to the interrupt terminal of the CPU 40. When the wake-up signal WU2 is inputted to the CPU 40, the CPU 40 immediately returns from the sleep mode to the active mode and drives and controls the motor 20 according to the usual program processing.

Next, the processing of calculating the estimated temperature when the CPU 40 operates in the active mode while the motor 20 is stationary will be described. This processing is repeatedly performed at intervals of a predetermined time (for example, 4 msec).

First, in step S1, the controller 31 determines on the basis of the ignition signal whether the ignition switch of the vehicle is turned on or off. This processing determines whether or not the CPU 40 shifts from the active mode to the sleep mode. When the ignition signal is turned off (step S1:YES), in step S2, the CPU 40 stops outputting an active signal ACT and outputs a clear signal CLR to reset the counter 52 and then shifts to the sleep mode.

By contrast, when the ignition signal is turned on (step S1: NO), in step S3, the CPU 40 performs the processing of calculating a correction value (subtraction temperature ΔT2). In this processing, the CPU 40 reads the value of the temperature counter at that time and calculates a subtraction temperature ΔT2 corresponding to the value of the temperature counter from the subtraction temperature data b.

In step S4, the CPU 40 performs the processing of updating the temperature counter. In this processing, the CPU 40 subtracts the calculated subtraction temperature ΔT2 from the read value of the temperature counter and then writes again the calculated value to the temperature counter.

Successively, in step S5, the CPU 40 calculates an ambient temperature on the basis of an ambient temperature detection signal from the temperature sensor 33 and determines whether or not the value of the temperature counter is smaller than the value of the ambient temperature.

When the value of the temperature counter is smaller than the calculated value of the ambient temperature (step S5: YES), to match the value of the temperature counter to the ambient temperature, the CPU 40 updates in step S6 the value of the temperature counter by the calculated value of the ambient temperature and then returns the processing again to step S1.

By contrast, when the value of the temperature counter is not smaller than the calculated value of the temperature counter (step S5: NO), the CPU 40 keeps the value of the temperature counter at a value updated in step S4 and then returns the processing again to step S1.

In this manner, the CPU40 continues updating the value of the temperature counter in the active mode until a predetermined time is elapsed since the motor is stopped.

Next, the processing of calculating the estimated temperature when the CPU 40 is operated in the sleep mode will be described on the basis of FIG. 7. This processing is repeatedly performed at intervals of a predetermined time (for instance, at intervals of (10 sec+4 msec)).

First, in step S11, the controller 31 operated in the sleep mode performs the processing of waiting a wake-up signal WU1. In the state of sleep, an active signal ACT is not outputted from the CPU40. Hence, when a sleep time Ts passes, a wake up signal WU1 outputted from the comparator 55 passes through the AND gate 56 and is inputted to the CPU40.

Here, in this embodiment, when the CPU40 receives the wake up signal WU1 in the state of sleep, the CPU 40 starts up and starts the processing. However, the CPU 40 may be in the starting state and may continue detecting whether or not a wake-up signal WU1 is inputted.

When the wake-up signal WU1 is not inputted to the CPU40 (step S11: NO), a sleep time Ts does not pass yet. Therefore, CPU40 repeats step S11.

By contrast, when the wake-up signal WU1 is inputted to the CPU40 (step S11: YES), the CPU40 returns to the active state in step S12.

Then, in step S13, the CPU 40 performs the processing of calculating a correction value (subtraction temperature ΔT1). In this processing, the CPU 40 reads the value of the temperature counter and calculates a subtraction temperature ΔT1 corresponding to this value of temperature counter from the subtraction temperature data (a).

Then, in step S14, the CPU 40 performs the processing of updating the temperature counter. In this processing, the CPU 40 subtracts the calculated subtraction temperature ΔT1 from the value read from the temperature counter and writes the calculated value to the temperature counter.

Successively, in step S15, the CPU 40 calculates an ambient temperature on the basis of an ambient temperature detection signal from the temperature sensor 33 and determines whether or not the value of the temperature counter is smaller than the calculated value of the ambient temperature.

When the value of the temperature counter is smaller than the calculated value of the ambient temperature (step S15: YES), to match the value of the temperature counter to the calculated value of the ambient temperature, the CPU 40 updates the value of the temperature counter in step S16 by the calculated value of the ambient temperature and advances the processing to step S17.

By contrast, when the value of the temperature counter is not smaller than the calculated value of the ambient temperature (step S15: NO), the CPU 40 keeps the value of the temperature counter at the value updated in step S14 and advances the processing to step S17.

In step S17, the CPU 40 outputs a clear signal CLR so as to again return to the state of sleep to thereby reset the counter 52 and then returns the processing again to step S11 after an active time Ta passes from the time when the CPU 40 returns to the active state.

In this manner, in the sleep mode when the motor 20 is stationary, the CPU 40 continues updating the value of the temperature counter every time a predetermined time is elapsed.

Here, when a wake-up signal WU2 is inputted to the CPU 40, the CPU 40 is forcibly returned from the sleep mode to the active mode by interrupt processing.

Hereinafter, another embodiment of the present invention will be described. Here, the same constituent elements as those in the above-mentioned embodiment are denoted by the same reference symbols and their duplicated descriptions will be omitted.

In the above-mentioned embodiment, in the processing of calculating an estimated temperature in the sleep mode, the CPU 40 calculates a correction value ($\Delta T1$) at intervals of a repetition processing time and subtracts this correction value ($\Delta T1$) from the value read from the temperature counter to thereby update the value of the temperature counter. However, the following construction may be adopted. That is, this embodiment is constructed as follows: the CPU 40 calculates only correction values in the sleep mode and when the CPU 40 shifts to the active mode, the CPU 40 collectively subtracts the correction values during the operation time in the sleep mode from the value of the temperature counter to thereby update the value of the temperature counter. For this reason, the controller 31 stores and holds the correction value in the memory 41 as correction value storing means.

In the subtraction temperature data of this embodiment, as shown in FIG. 8, subtraction temperature $\Sigma T$ is set for the cumulative time of the sleep mode. In this embodiment, subtraction temperature data (c) is defined by a linear function but may be defined by a higher-order function.

A sleep control circuit 50 of this embodiment, as shown in FIG. 9, has a counter 58 added thereto. When the CPU 40 shifts from the active mode to the sleep mode, this counter 58 is reset by a clear signal CLR and while the CPU 40 operates in the sleep mode, the counter 58 continuously receives and counts up a clock signal from a sub-clock 51. The cumulative time of the sleep mode can be calculated by this counter 58.

Next, the processing of calculating an estimated temperature when the CPU 40 operates in the sleep mode will be described on the basis of FIG. 10. Since steps S21 and S22 are the same as steps S11 and 12, their descriptions will be omitted.

When the CPU 40 returns to the active state in step S22, the CPU 40 as correction value calculating means performs in step S23 the processing of calculating a correction value (subtraction temperature $\Sigma T$). In this processing, the CPU 40 calculates subtraction temperature $\Sigma T$ from the subtraction temperature data (c) on the basis of the value of the counter 58 at that time.

Then, the CPU 40 performs the processing of updating a correction value in step S24. In this processing, the calculated subtraction temperature $\Sigma T$ is written to the memory 41 as a correction value.

Successively, in step S25, the CPU 40 outputs a clear signal CLR so as to return again to the state of sleep to thereby reset the counter 52 and then returns the processing to step S21.

In this manner, in the sleep mode when the motor 20 is stationary, the CPU 40 continues updating the correction value every time a predetermined time is elapsed.

FIG. 11 shows interrupt processing when a wake-up signal WU2 is inputted to the CPU 40. The controller 31 is forcibly returned from the sleep mode to the active mode by this processing.

When a wake-up signal WU2 is inputted to the interrupt terminal of the CPU 40 in step S31, the CPU 40 returns in step S32 from the sleep mode to the active mode.

Then, in step S33, the CPU 40 as estimated temperature calculating means performs the processing of calculating an estimated temperature. In this processing, a correction value finally stored in step S24 is subtracted from the value of the temperature counter that is stored before shifting to the sleep mode and is held without being updated during the sleep mode.

In step S34, the CPU 40 calculates an ambient temperature on the basis of an ambient temperature detection signal from the temperature sensor 33 and determines whether or not the value of the temperature counter is smaller than the calculated value of the ambient temperature.

When the value of the temperature counter is smaller than the calculated value of the ambient temperature (step S34: YES), to match the value of the temperature counter to the calculated value of the ambient temperature, the CPU 40 updates the value of the temperature counter by the calculated value of ambient temperature in step S35 and then finishes the processing.

By contrast, when the value of the temperature counter is not smaller than the calculated value of the ambient temperature (step S34: NO), the CPU 40 keeps the value of the temperature counter at the value updated in step S33 and then finishes the processing.

Moreover, still another embodiment of the present invention will be described on the basis of FIG. 12. In this embodiment, it is determined on the basis of the time that passes after the rotation of the motor 20 is stopped whether or not the CPU 40 is shifted from the active mode to the sleep mode. First, in step S41, the CPU 40 determines on the basis of a clock signal inputted from the main clock 44 whether or not a predetermined time is elapsed since the output of a control signal for driving the motor 20 via the drive circuit 32. That is, the CPU 40 determines whether or not a predetermined time is elapsed in a normal operation from the time when the motor 20 stops rotating. In this processing, it is determined whether or not the CPU 40 is shifted from the active mode to the sleep mode. When a predetermined time is elapsed since the end of operation (step S41: YES), in step S42, the CPU 40 stops outputting an active signal ACT and outputs a clear signal CLR to thereby reset the counter 52 and then shifts to the sleep mode.

By contrast, when a predetermined time does not pass from the end of operation (step S41: NO), the CPU 40 performs the processing of calculating a correction value (subtraction temperature $\Delta T2$) in step S43.

Successively, in step S45, the CPU 40 calculates an ambient temperature on the basis of an ambient temperature detection signal from the temperature sensor 33 and determines whether or not the value of the temperature counter is smaller than the calculated value of the ambient temperature.

When the value of the temperature counter is smaller than the calculated value of the ambient temperature (step S45: YES), to match the value of the temperature counter to the calculated value of the ambient temperature, the CPU 40 updates the value of the temperature counter by the calculated value of ambient temperature in step S46 and then returns the processing to step S41.

By contrast, when the value of the temperature counter is not smaller than the calculated value of the ambient temperature (step S45: NO), the CPU 40 keeps the value of the temperature counter at the value updated in step S44 and then again returns the processing to step S41.

In this manner, the CPU 40 continues updating the value of the temperature counter until a predetermined time is elapsed since the motor 20 is stopped.

In this manner, it is possible to reduce electric power consumption and to calculate the estimated temperature when the motor 20 is stationary also by calculating only the correction value while the CPU 40 operates in the sleep mode and by updating the value of the temperature counter on the basis of the newest correction value when the CPU returns to the active mode.

That is, according to the motor controller of the present invention, when the motor is stopped and the ignition switch is turned off and power generation by driving the engine is stopped, the operation mode is switched under a predetermined condition from a normal operation mode to a sleep mode that is an operation mode of low electric power consumption. Moreover, the present invention is constructed so that the processing of calculating the estimated temperature of a motor may be performed at intervals of a predetermined sleep time in this sleep mode. Hence, it is possible to reduce operating electric power when the ignition switch is turned off and to successively perform the processing of calculating the estimated temperature of a motor also while the motor is stationary. In particular, in a device such as power window device in which the window is operated by a motor only for an extremely short time with respect to a running time, it is possible to considerably reduce the amount of consumption of electric power.

Moreover, in the above-mentioned embodiment, the sleep control circuit 50 is arranged separately from the CPU 40 so as to shift the CPU 40 from the sleep mode to the active mode. However, the CPU 40 may be constructed so as to have the function of the sleep control circuit 50.

In the above-mentioned embodiment has been described the embodiments in which the present invention is applied to the power window device 1. However, the present invention can be applied to all devices provided with a motor.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor controller comprising:
   an estimated temperature calculating means that calculates an estimated temperature of a motor; and
   a control unit that can perform a driving control of the motor only when the estimated temperature is not larger than a predetermined value,
the motor controller further comprising:
   a mode switching means that switches the control unit and the estimated temperature calculating means between in a normal operation mode in which the control unit and the estimated temperature calculating means can drive the motor and in a sleep mode in which electric power consumption of the control unit and the estimated temperature calculating means is smaller than in the normal operation mode in accordance with a predetermined condition while the motor is stationary; and
   an activating means that activates the estimated temperature calculating means in the sleep mode for a predetermined active time every time a predetermined sleep time is elapsed.

2. The motor controller according to claim 1, further comprising an estimated temperature storing means that stores the estimated temperature,
   wherein the estimated temperature calculating means updates the estimated temperature stored in the estimated temperature storing means to a newly calculated estimated temperature when the estimated temperature calculating means newly calculates the estimated temperature.

3. The motor controller according to claim 2, further comprising correction value calculating means that calculates a correction value for correcting the estimated temperature stored in the estimated temperature storing means,
   wherein the estimated temperature calculating means update the estimated temperature to a corrected estimated temperature by correcting the estimated temperature stored in the estimated temperature storing means by the correction value.

4. The motor controller according to claim 3,
   wherein the activating means activates the correction value calculating means in the sleep mode for a predetermined active time every time a predetermined sleep time is elapsed.

5. The motor controller according to claim 3, further comprising correction value storing means for storing the correction value calculated by the correction value calculating means,
   wherein the estimated temperature calculating means updates the estimated temperature to the corrected estimated temperature by correcting the estimated temperature stored in the estimated temperature storing means by the correction value when the mode switching means returns the control unit and the estimated temperature calculating means from the sleep mode to the normal operation mode.

6. The motor controller according to claim 1, wherein the sleep time is set longer than the active time.

7. The motor controller according to claim 1,
   wherein the mode switching means switches the control unit and the estimated temperature calculating means from the normal operation mode to the sleep mode under the predetermined condition that an engine of a vehicle is stopped and switches the control unit and the estimated temperature calculating means from the sleep mode to the normal operation mode under the predetermined condition that the engine is started.

* * * * *